H. W. LEE AND J. W. SWINDALE.
APPARATUS FOR LOADING ORDNANCE.
APPLICATION FILED MAR. 22, 1921.
1,392,583.
Patented Oct. 4, 1921.
4 SHEETS—SHEET 1.
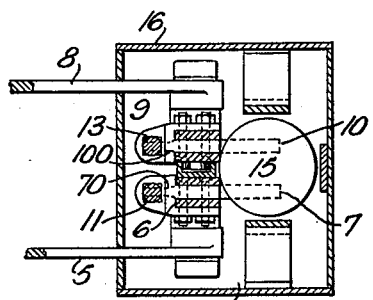
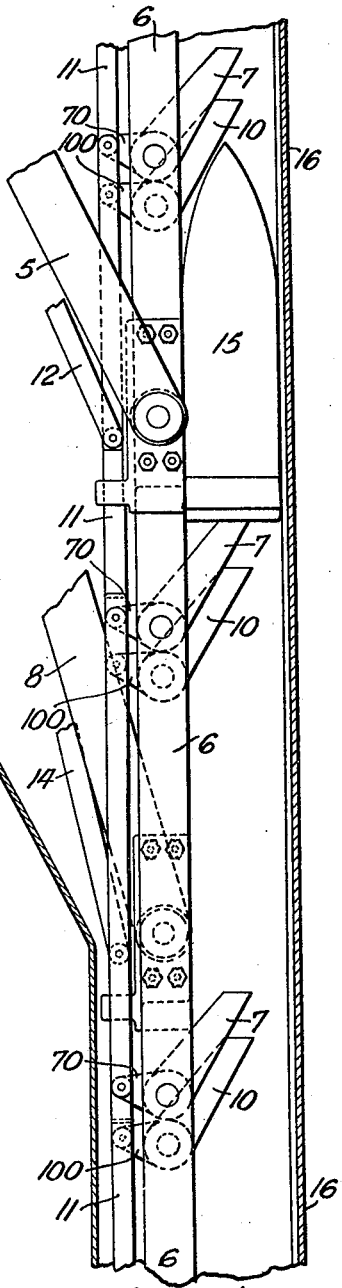
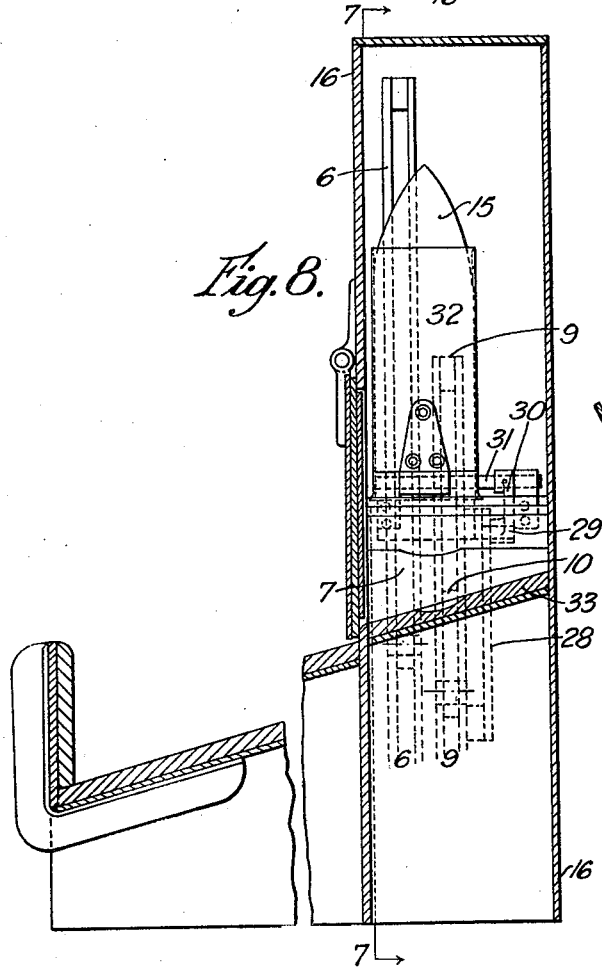
Inventors:—
H. W. Lee + J. W. Swindale
By their Attorneys,

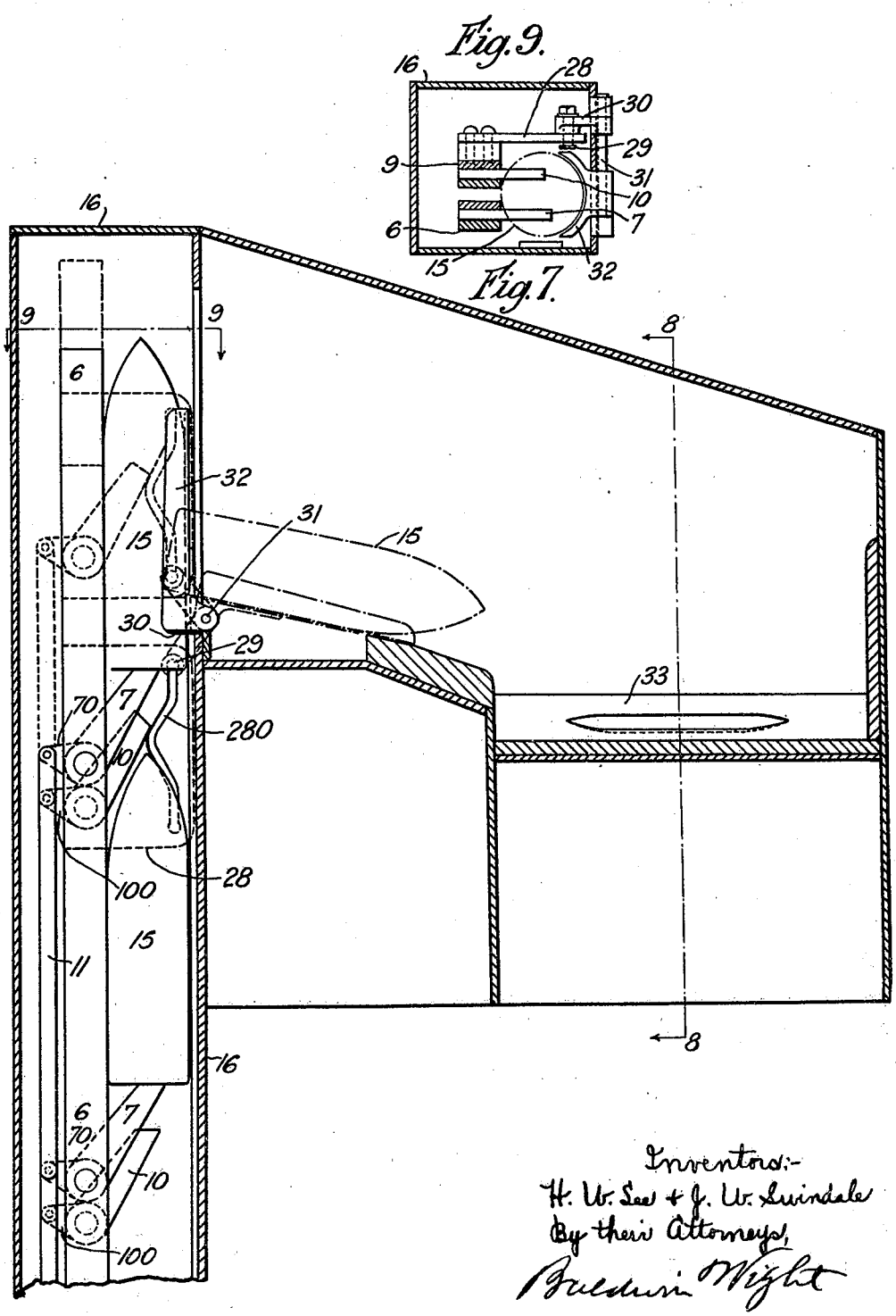

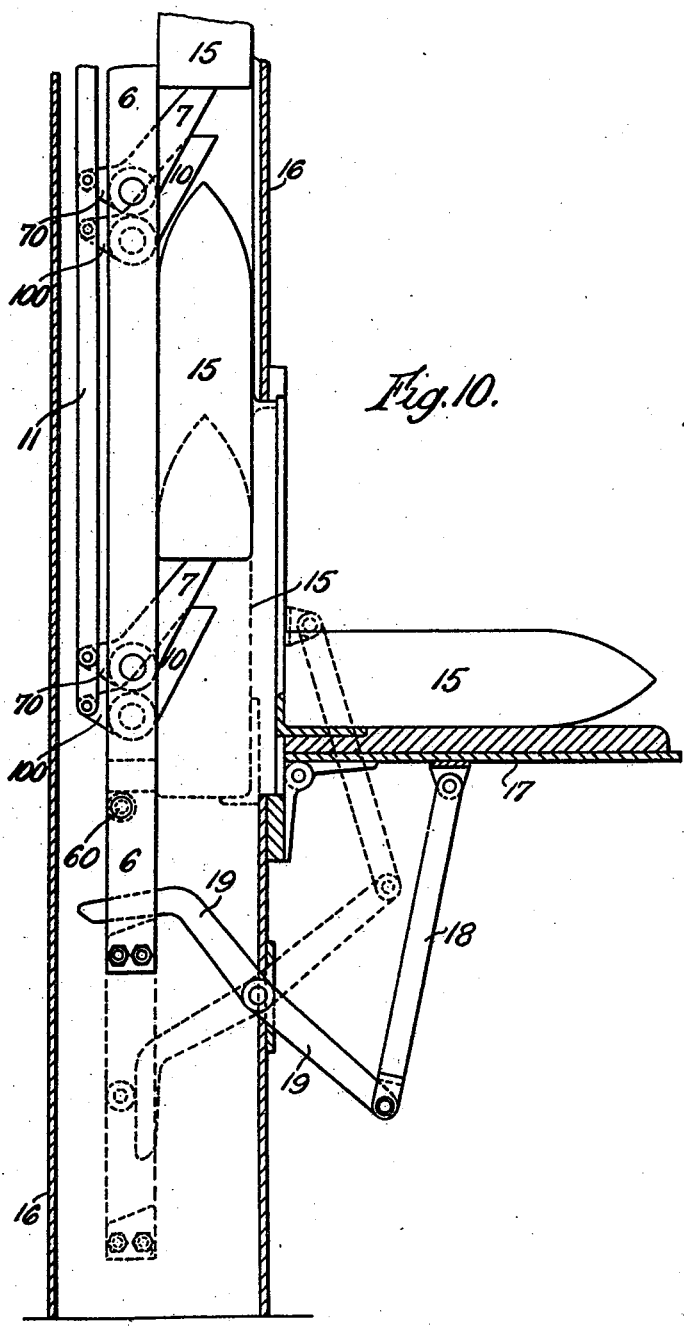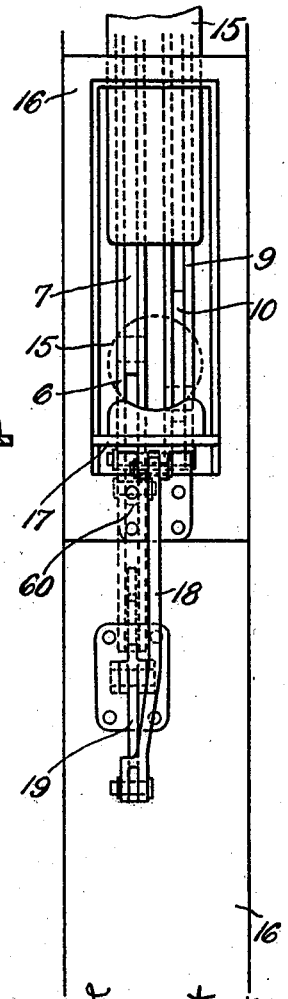

UNITED STATES PATENT OFFICE.

HUGH WARREN LEE AND JOHN WINDLOW SWINDALE, OF NEWCASTLE-UPON-TYNE, ENGLAND, ASSIGNORS TO SIR W. G. ARMSTRONG, WHITWORTH AND COMPANY, LIMITED, OF NEWCASTLE-UPON-TYNE, ENGLAND.

APPARATUS FOR LOADING ORDNANCE.

1,392,583.  Specification of Letters Patent.  Patented Oct. 4, 1921.

Application filed March 22, 1921. Serial No. 454,472.

*To all whom it may concern:*

Be it known that we, HUGH WARREN LEE and JOHN WINDLOW SWINDALE, subjects of the King of Great Britain, residing at Elswick Works, Newcastle-upon-Tyne, England, have invented new and useful Improvements in Apparatus for Loading Ordnance, of which the following is a specification.

This invention relates to improvements in ammunition hoists.

According to this invention we provide two sets of arms and to both sets are imparted both reciprocating movements up and down the trunk and rocking movements into and out of the path of the projectiles. When one set of arms carries the projectiles up the trunk the other set of arms descends, the latter arms having been rocked out of the path of the projectiles. When the latter arms have passed the projectiles they are rocked back and begin to ascend and move the projectiles up the trunk while the first mentioned arms descend, being likewise rocked while passing the projectiles. The sets of arms are pivoted to sliders which are reciprocated in opposite directions by crank arms on a shaft and the sets of arms are pivoted to rods which are actuated by means of cams on the cranks so that the arms are rocked.

The accompanying drawings show a hoist made in accordance with this invention.

Figure 3:
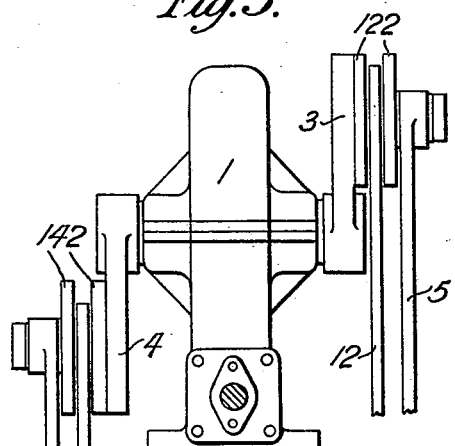
Figure 4:
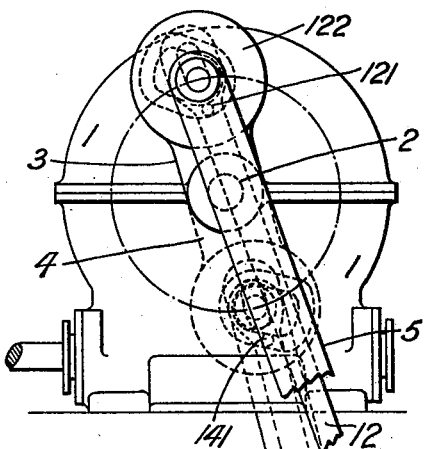
Figure 5:
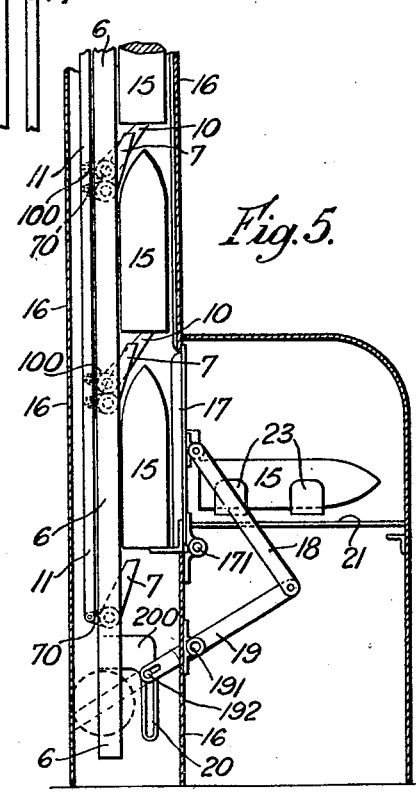
Figure 6:
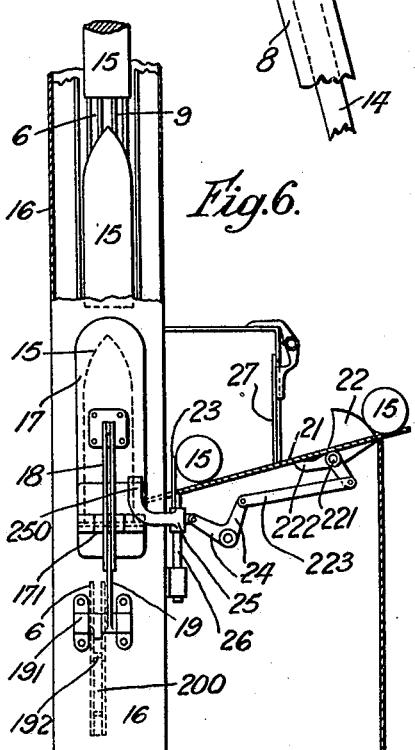

Figure 1 is a vertical section; Fig. 2 a horizontal section of the hoist; Figs. 3 and 4 front and side elevations of the driving mechanism; Fig. 5 a vertical section and Fig. 6 a front elevation, partly in section, of the bottom of the hoist drawn to a smaller scale; Fig. 7 is a vertical section of the upper part of the hoist on the line 7—7, Fig. 8; Figs. 8 and 9 sections on the lines 8—8 and 9—9, Fig. 7, and Figs. 10 and 11 are vertical section and front elevation of a modification of the bottom of the hoist.

1 is a gear case containing suitable gearing for driving a shaft 2 upon which are two crank arms 3 and 4. One end of a rod 5 is pivoted to the crank arm 3 and its other end is pivoted to a slider 6 to which are pivoted lifting arms 7, and similarly another rod 8 is pivoted at one end to crank arm 4 and at the other end to a slider 9 to which are pivoted other arms 10. To the arms 7 are fixed lugs 70 which are pivoted to a rod 11. To the rod 11 is pivoted a link 12 having pins 121 which enter grooves in cam plates 122 on the crank arm 3. Similarly the arms 10 have lugs 100 pivoted to a rod 13 to which is pivoted a link 14 having pins 141 which enter grooves in cam plates 142 on the crank arm 4. When the shaft 2 is revolved the sliders 6 and 9 with the rods 11 and 13 are moved up and down carrying with them the sets of arms 7 and 10 respectively. When the set of arms 7 carries the projectiles 15 up the trunk 16 the other set of arms 10 descends, the arms 10 having been rocked out of the path of the projectile owing to the descent of the rod 11 under the action of the link 12. When the arms 10 have passed the projectile they are rocked back again and begin to ascend and move the projectile up the trunk 16 while the arms 7 descend and are rocked similarly to the arms 10.

The projectiles 15 are run on to a lifting door 17 secured to the trunk 16 by a horizontal hinge 171. The door 17 is turned on the hinge 171 by means of a link 18 by which it is connected to one end of a lever 19 pivoted at 191, and a pin 192 on the other end of the lever 19 enters a slot 20 in a plate 200 on the slider 6. As the slider 6 descends the door 17 is raised from a horizontal to a vertical position in which it closes an opening in the side of the trunk 16. The projectiles 15 roll down a waiting tray 21, the descent being controlled by stops 22 and 23. The stop 22 is pivoted at 221 and has a claw 222 and is connected by a link 223 to one arm of a bell crank lever 24 whose other arm is connected to a socket 25 mounted on a rod 26, the socket 25 having an upturned arm 250 which is depressed by the door 17 when it is opened. The stop 23 which slides vertically is mounted on the socket 25.

When the hoist is started the first downward movement of the lifting arms 7 of the slider 6 raises the lifting door 17 and the stops 22 and 23 rise. A projectile 15 is then placed on the waiting tray 21 above the stop 22 and as the lifting arms 7 rise the lifting door 17 comes down and so do the stops, the first projectile rolling into the claw 222 of the pivoted stop 22. When the lifting arms 7 come down again the lifting door 17 rises as do the stops and the first projectile rolls out of the claw 222 until it comes against the second stop 23 and a second projectile is placed above the stop 22. As the lifting arms 7 rise again the lifting door 17 comes down and so do the stops and the first projectile therefore rolls on to the lifting door 17 and the second projectile moves into the claw 222. When the lifting arms 7 again come down the lifting door 17 rises carrying the first projectile with it ready to be raised by the lifting arms 7 on their next upward movement, and so on. A flash tight door 27 is provided between the two stops 22 and 23.

In the modification shown in Figs. 10 and 11 the pivoted lever 19 is actuated by a roller 60 on the slider 6.

At the top of the slider 9 is a plate 28 having a slot 280 in which is a pin 29 at one end of an arm 30 fixed to the hinge 31 of a tray 32 at the top of the trunk 16. The top surface of the top lifting arm 10 is formed in such a way that the projectile 15 upon it tends to topple over sidewise, and bears against the tray 32.

When the slider 9 is nearing its highest position the tray 32 is turned outward by the arm 30 allowing the projectile 15 to slide onto another tray 33.

What we claim is:—

1. In a hoist, a trunk, two independently operated sliders in the trunk, a number of lifting arms pivoted to the sliders, means for raising and lowering the sliders and positively acting means for rocking the lifting arms on their pivots.

2. In a hoist, a trunk, two independently operated sliders in the trunk, a number of lifting arms pivoted to the sliders, a shaft, crank arms on the shaft connected to the sliders, means for driving the shaft, and positively acting means for rocking the lifting arms on their pivots.

3. In a hoist, a trunk, two independently operated sliders in the trunk, a number of lifting arms pivoted to the sliders, a shaft, crank arms on the shaft connected to the sliders, means for driving the shaft, cams on the cranks, links actuated by the cams and two rods connected to the links and the lifting arms.

4. In a hoist, a trunk, two independently operated sliders in the trunk, a number of lifting arms pivoted to the sliders, a shaft, crank arms on the shaft connected to the sliders, means for driving the shaft, cams on the cranks and means actuated by these cams for rocking the lifting arms on their pivots.

5. In a hoist, a trunk, two sliders in the trunk, a number of lifting arms pivoted to the sliders, means for alternately raising one slider and lowering the other, and positively acting means for rocking the lifting arms on their pivots.

6. In a hoist, a trunk, a reciprocating slider in the trunk, a number of lifting arms pivoted to the slider, a lifting tray hinged to the trunk and connected to the slider, means for reciprocating the slider, and means for rocking the lifting arms on their pivots.

7. In a hoist, a trunk, a reciprocating slider in the trunk, a number of lifting arms pivoted to the slider, a lifting tray hinged to the trunk and connected to the slider, stops actuated by the lifting tray, means for reciprocating the slider and means for rocking the lifting arms on their pivots.

8. In a hoist, a trunk, a reciprocating slider in the trunk, a number of lifting arms pivoted to the slider, a lifting tray hinged to the trunk and connected to the slider, stops actuated by the lifting tray, one being pivoted and provided with a claw and the other capable of sliding vertically, means for reciprocating the slider and means for rocking the lifting arms on their pivots.

9. In a hoist, a trunk, a reciprocating slider, a number of lifting arms pivoted to the slider, a tray pivoted at the top of the the trunk, a slotted plate carried by the slider and adapted to actuate the tray, means for reciprocating the slider and means for rocking the lifting arms on their pivots.

In testimony that we claim the foregoing as our invention we have signed our names this 23rd day of February 1921.

HUGH WARREN LEE.
JOHN WINDLOW SWINDALE.